Aug. 24, 1926.
H. RITOW
SLIDE RULE
Filed Dec. 22, 1923    3 Sheets-Sheet 1
1,597,483
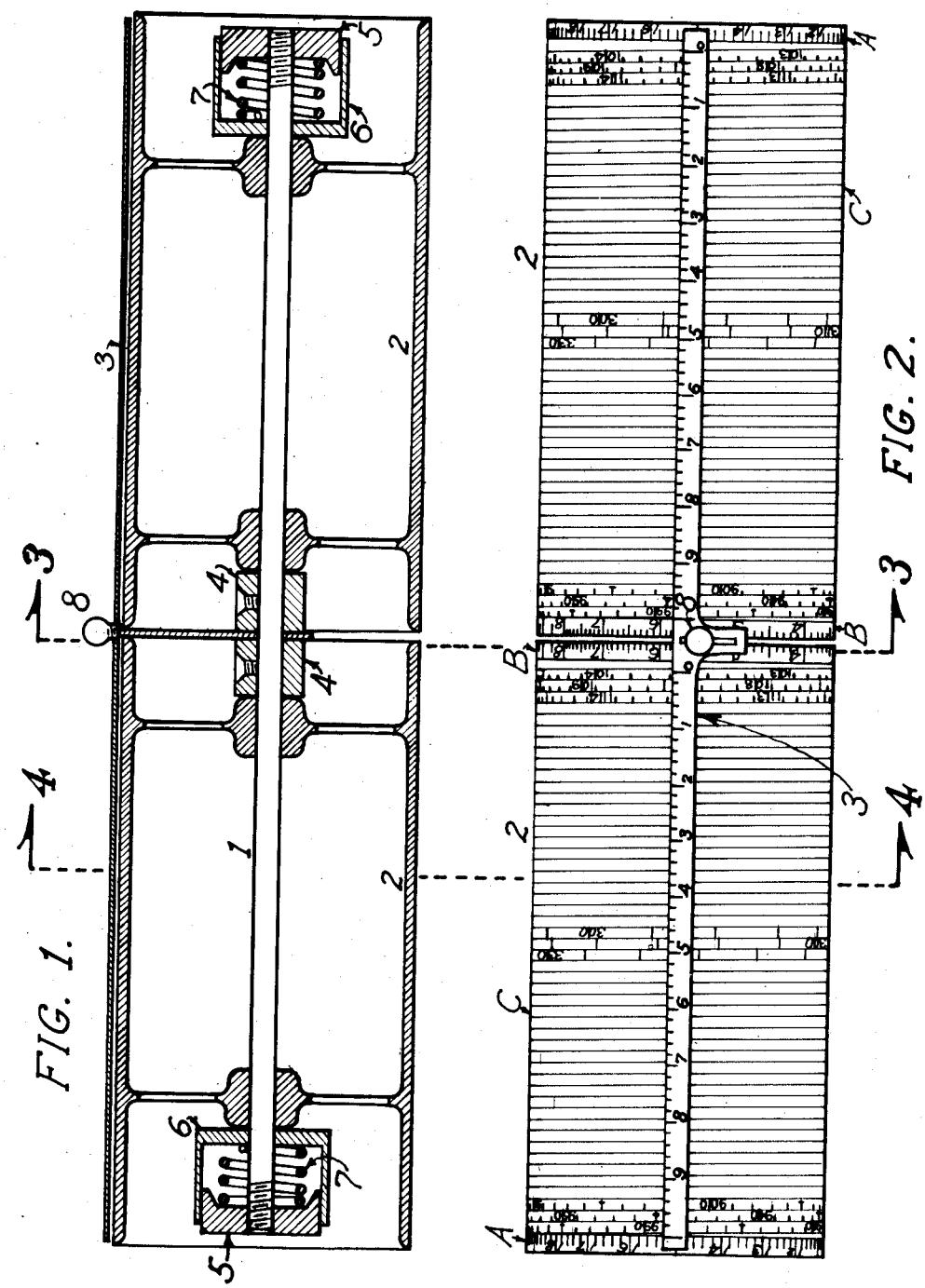
INVENTOR
Herman Ritow.

Aug. 24, 1926.  1,597,483
H. RITOW
SLIDE RULE
Filed Dec. 22, 1923   3 Sheets-Sheet 2

INVENTOR
Herman Ritow

Aug. 24, 1926.
H. RITOW
1,597,483
SLIDE RULE
Filed Dec. 22, 1923    3 Sheets-Sheet 3
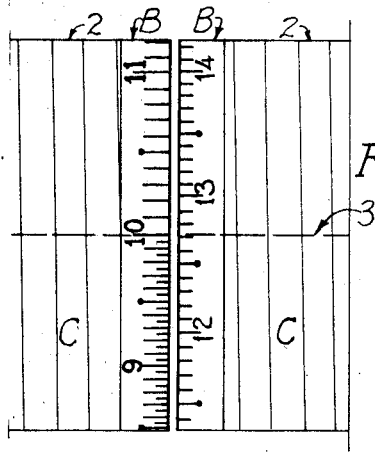
FIG. 5.
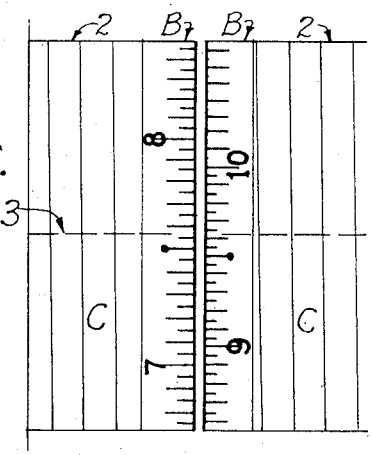
FIG. 6.
FIG. 7.
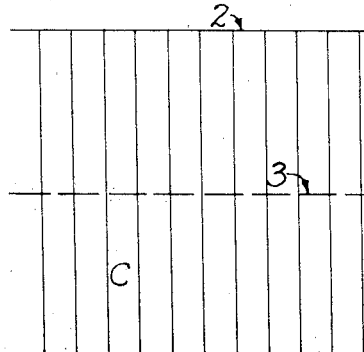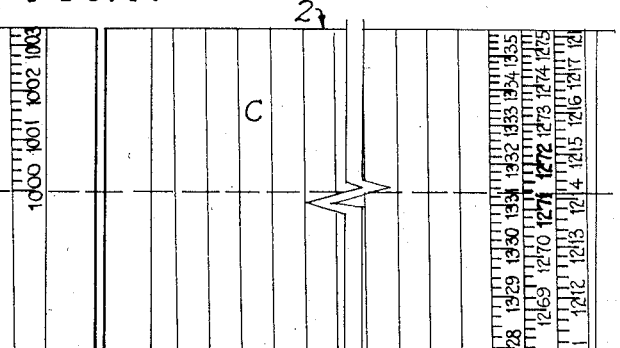
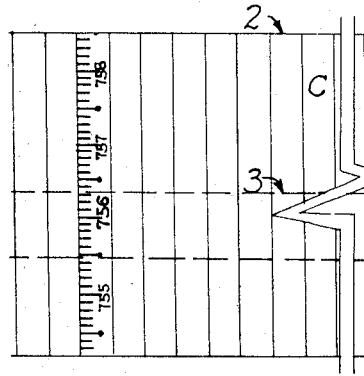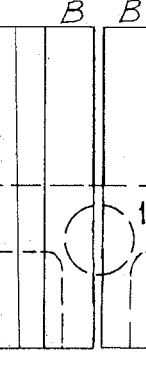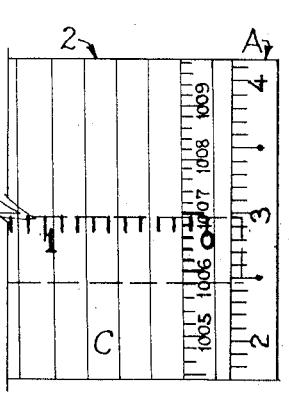
FIG. 8.
INVENTOR.
Herman Ritow.

Patented Aug. 24, 1926.

1,597,483

UNITED STATES PATENT OFFICE.

HERMAN RITOW, OF CHICAGO, ILLINOIS, ASSIGNOR TO THE FREDERICK POST COMPANY, OF CHICAGO, ILLINOIS, A CORPORATION OF ILLINOIS.

SLIDE RULE.

Application filed December 22, 1923. Serial No. 682,363.

The present invention has relation to an improvement in that class of mathematical sliderules in which a cylindrical body rotating about an axis is provided with a helical logarithmic scale and of which a typical example is the well known Fuller's sliderule.

The object of the present invention is to provide an improved cylindrical sliderule of very great accuracy and of simple and easy operation. The Fuller rule has great accuracy but is clumsy to handle. All the other sliderules for great accuracy such as the Thacher sliderule are large, unwieldly and even confusing. I attain this object by a novel arrangement of two rotating cylinders, each provided with helical and with circular logarithmic scales, as illustrated in the accompanying drawing, in which:—

Fig. 1 is a longitudinal section through the device showing the method of construction, Fig. 2 is a top view of the sliderule showing the location of the logarithmic scales, Fig. 3 is a section at right angles to the axis taken between the two cylinders, on line 3—3, Figs. 1 and 2, Fig. 4 is a crosssection through a cylinder on line 4—4, Figs. 1 and 2, Fig. 5 is a view to enlarged scale showing part of the scales B for the first setting of both cylinders to find the product of 7.5632 by 1.27133.

Fig. 6 is a view to enlarged scale showing part of the scales B for the second setting to find the product of 7.5632 by 1.27133.

Fig. 7 is a view to enlarged scale showing part of the scale C for the third setting to find the product of 7.5632 by 1.27133, and Fig. 8 is a view to enlarged scale showing part of the scales C for the fourth and last setting to find the product of 7.5632 by 1.27133.

Figure 3:
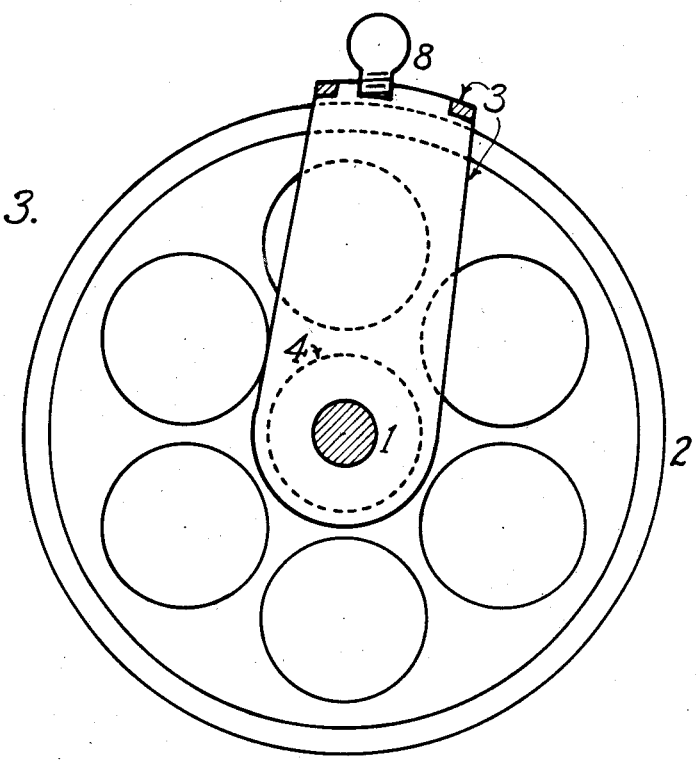
Figure 4:
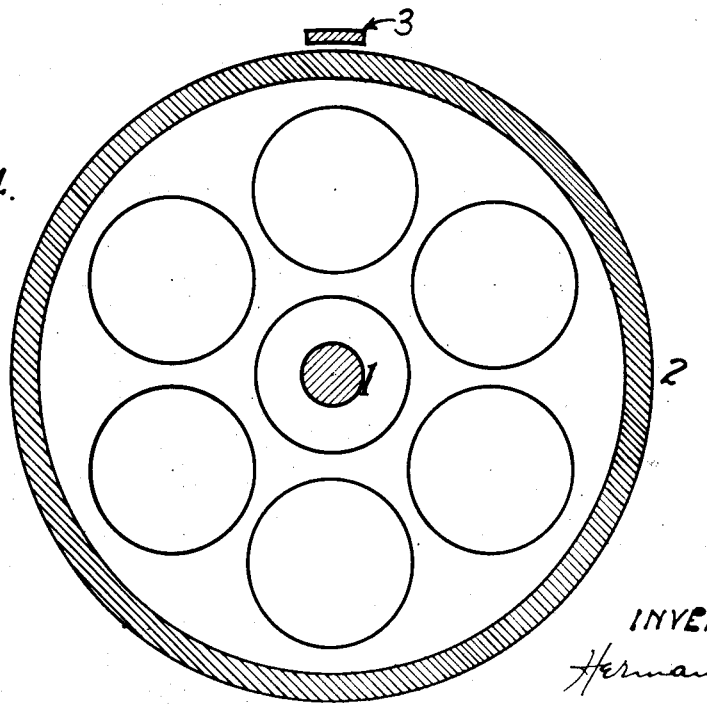

Similar numerals and letters refer to similar parts throughout the four views. The integral parts of the improved sliderule are the axle 1, the rotating cylinders 2, the index rod 3, the clamps 4 and 5, the spring boxes 6 and the springs 7.

By pulling either springbox 6 towards the nearby clamp 5 the adjoining cylinder 2 is free to rotate smoothly around the axle 1. The springbox 6 when not pulled towards the clamp 5 keeps the adjoining cylinder 2 in any desired position. The index rod 3 is provided with a crosspiece that fits snugly around the axle 1. The clamps 4 are screwed tightly to the axle 1 on each side of said crosspiece so that the index rod 3 is held firmly in any given position by friction with the two clamps 4, and so that when desired the index rod can be moved by pushing on the handle 8 connected to the index rod 3, the two clamps 4 not being placed so tightly against the crosspiece as to prevent the forced motion of the index rod. The two clamps 5 are screwed tightly to the ends of the axle 1. The spring 7 is held between the clamp 5 and the spring box 6 so that the spring pushes the spring box against the cylinder 2, keeping the latter in any fixed position so long as the spring box 6 is not drawn towards the clamp 5. Clamps 4 and 5 are provided with screws with which said clamps can be tightened to the axle 1.

Each of the cylinders 2 is provided with three scales, A, B and C, marked on the cylindrical surface. Scale A is a uniformly subdivided scale, the subdivisions being all equal. Scale B is a logarithmic scale of the length of the circumference of the cylinder exactly equivalent to the "D" scale of the Mannheim rule and wound just once around the cylinder. Scale C is a helical scale of many times the length of the circumference of the cylinder and helically wound around the cylinder.

The index rod 3 is provided on each side with a uniform scale, each of whose smallest subdivisions corresponds to the pitch of the helix of scale C. The subdivisions are numbered so that the cylinder length of the helix is divided into ten equal parts and numbered from 0 to 10. Scale A in its entirety further subdivides the smallest subdivision of the index rod scale.

To perform a multiplication four steps are made as illustrated in Figs. 5, 6, 7, 8.

First the index or 1 reading of the B scale of the left hand cylinder is set opposite one factor on the B scale of the right cylinder. Fig. 5 shows the 1 of the left B scale opposite the reading 1271 on the right B scale.

The second step is to turn the index rod till its edge covers the reading of the second factor on the B scale of the left cylinder. The preliminary answer is found under the edge of the index rod on the B scale of the right cylinder.

Fig. 6 shows the setting for this second step and the preliminary answer is seen to be 962.

The third step consists in setting the index rod edge directly over the index or 1 reading of the C scale of the left cylinder and turning the right cylinder till one factor is directly under the edge of the index rod.

Fig. 7 shows the index rod edge directly over 1 on the C scale of the left cylinder and directly over 1.27133 on the C scale of the right cylinder.

The fourth and last step consists of turning the index rod till its edge covers the second factor on the C scale of the left cylinder. The answer is then picked out from the many readings of the right cylinder C scale by finding the particular reading closest to the approximate answer found from the first two steps.

Fig. 8 shows the index rod edge covering the second factor 75632 on the C scale of the left cylinder and shows the index rod edge covering many numbers on the C scale of the right cylinder. The three nearest to the approximate answer 962 are 91896, 96153 and 100685. It is evident that the nearest answer is 96153 and this answer checks with the approximate answer within ¼ per cent as it should.

It is readily seen that the third and fourth steps (Figs. 7 and 8) differ from the first two (Figs. 5 and 6) only in the following:

The C scales are used in place of the B scales and the answer is picked out with the help of that obtained from steps 1 and 2.

It is also readily seen that steps 1 and 2 are identical with the steps of ordinary multiplication as performed on the Mannheim slide rule. The left cylinder takes the place of the slide, the right cylinder that of the body, the index rod is used like the indicator, the left B scale corresponds with the Mannheim C scale and the right B scale corresponds with the Mannheim D scale.

Division likewise is performed in four steps, as illustrated by Figs. 6, 5, 8 and 7. These steps are the reverse of those used in multiplication. First the divisor on the left B scale is set opposite the dividend, on the right B scale. Thus in Fig. 6 we have the first step in the division $$\frac{9.6153}{7.5632} = 1.27133.$$

The divisor 756 is set on the left B scale opposite the dividend 962 on the right B scale. In step 2 we turn the two cylinders together till the 1 or index reading on the left B scale can be seen and find the approximate answer on the right B scale opposite the 1 or index reading on the left B scale.

In Fig. 5 we find the approximate answer to be 1271. The third and fourth steps consist of a repetition of the first and second except that we use the C scales in place of the B scales and that we must use the index rod and the approximate answer to pick out the accurate answer. Thus in Fig. 8 the divisor 75632 on the left C scale is placed simultaneously under the index rod edge with the dividend 96153 on the right C scale, and in Fig. 7 the index rod has been turned to cover 1 reading or index of the left C scale. It covers simultaneously on the right C scale the numbers 121411, 127133 and 133125. The nearest to the approximate answer is 127133 and this checks with the former to ¼ per cent as it should.

It is readily seen again that the operation of dividing is almost identical with that used on the Mannheim slide rules.

To find the logarithm of a number, turn either cylinder till the desired number is under the edge of the index rod. Read the first two digits of the logarithm on the index rod adjacent to the graduated edge of the number and read the last three or more digits on the A scale under the edge of the index rod. Thus in Fig. 8 the logarithm of 96153 is read .98 on the index rod and on the A scale we read 296. The logarithm is, therefore, .98296.

It is to be noted that every accurate computation with the improved sliderule contains within itself a check to the accuracy of the preliminary computation with the B scales. This check being absolutely independent of the final operation, the computer has the certainty that his answer is correct. If a mistake is made in either the preliminary or the accurate computation, no number under the indexrod will agree with the first preliminary answer and the computer knows he must repeat the computation. This makes the improved sliderule a very advantageous one for those who desire accuracy and considering the great simplicity of operating with the new sliderule it should appeal to the large class of merchants who have been asking for specially accurate and simple sliderules.

In my Patent No. 1,405,333, patented January 31, 1922, I show a sliderule whose accuracy can be raised to ten or even twenty times that of the ordinary Mannheim rule, this being done with the help of folded logarithmic scales, placed on the body and slide of the usual type of slide rule. My new improved sliderule described in this specification can easily be made for an accuracy of computation of fifty, one hundred or even one thousand times the accuracy of the ordinary Mannheim rule, this being done with the help of helical logarithmic scales, placed on two adjoining, freely rotating cylinders with a special index rod.

Of all the rules on the market the Fuller sliderule is the nearest to my rule in accuracy, its helical scale being fifty times the length of the usual Mannheim rule. Its clumsy operation with its one sliding and rotating cylinder and its three indices make it many times slower to work with than my rule without any check to give the operator certainty of correctness.

On account of the ease with which the cylinders can be turned in my improved sliderule as well as stopped and kept at any desired marking under the index rod the double cylindrical form of sliderule described in this specification is a very convenient one even for the elementary form of Mannheim scales. The cylindrically wound Mannheim scale has the added advantage of being continuous without any beginning or end thus making comptation with the cylindrical scales a simpler and quicker operation.

I claim as new and desire to secure with Letters Patent:—

1. A slide rule comprising an axle, two cylinders and an index rod rotating about said axle, said cylinders being each provided with two logarithmic scales, one of said scales being not longer than the circumference of the cylinder, the other being wound many times around the cylinder; said two cylinders and index rod coordinating in such wise that computation may first be performed with the short logarithmic scales, then repeated with the longer logarithmic scales, the more accurate answer being picked from the longer wound scales with the help of the answer first found with the short logarithmic scales.

2. A slide rule comprising an axle, two cylinders and an index rod rotating about said axle, said cylinders being each provided with two logarithmic scales, one of said scales being not longer than the circumference of the cylinder, the other being wound many times around the cylinder; said cylinders and index rod being provided each with uniformly divided scales for the determination of the logarithms of numbers; said two cylinders and index rod co-ordinating in such wise that computation may first be performed with the short logarithm scales, then repeated with the longer logarithmic scales, the more accurate answer being picked from the longer wound scales with the help of the answer first found with the short logarithmic scales.

3. In a slide rule, comprising two concentric cylinders, means for mounting them in fixed relation so that they may be free to rotate with respect one to the other, separate logarithmic scales wound spirally, a number of them about each cylinder, and separate logarithmic scales wound once about each cylinder, an index rod parallel with the axes of the cylinders and mounted for movement along their peripheries about their axes, the index rod having a pair of scales one for each cylinder extending throughout the entire length of so much of the cylinders as carries the spiral scale, the divisions on the rod being equal.

4. A slide rule comprising two cylinders mounted for rotation about the same axis and arranged end to end, an index rod mounted for rotation about their common axes, said cylinders being each provied wtih two logarithmic scales, one of said scales being not longer than the circumference of the cylinder, the other being wound many times around the cylinder; said two cylinders and index rod coordinating in such wise that computation may first be performed with the short logarithmic scales, then repeated with the longer logarithmic scales, the more accurate answer being picked from the longer wound scales with the help of the answer first found with the short logarithmic scales.

5. A slide rule comprising two cylinders mounted for rotation about the same axis and arranged end to end, an index rod mounted for rotation about their common axes, said cylinders being each provided with two logarithmic scales, one of said scales being not longer than the circumference of the cylinder, the other being wound many times around the cylinder; said cylinders and index rod being provided each wtih uniformly divided scales for the determination of the logarithms of numbers; said two cylinders and index rod coordinating in such wise that computation may first be peformed with the short logarithmic scales, then repeated with the longer logarithmic scales, the more accurate answer being picked from the longer wound scales with the help of the answer first found with the short logarithmic scales.

In witness whereof I sign my name, November 30, 1923.

HERMAN RITOW.